(12) United States Patent
Slone

(10) Patent No.: US 7,266,859 B2
(45) Date of Patent: Sep. 11, 2007

(54) SYSTEM OF VACUUM ACCESSIBILITY FOR A VEHICLE

(75) Inventor: Carolyn L. Slone, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 553 days.

(21) Appl. No.: 10/725,800

(22) Filed: Dec. 2, 2003

(65) Prior Publication Data

US 2004/0134013 A1 Jul. 15, 2004

Related U.S. Application Data

(60) Provisional application No. 60/430,295, filed on Dec. 2, 2002.

(51) Int. Cl.
*B60S 1/64* (2006.01)

(52) U.S. Cl. .............................. 15/313; 15/315; 15/323

(58) Field of Classification Search .................. 15/313, 15/323, 315; 242/384.7; *B60S 1/64*
See application file for complete search history.

(56) References Cited

U.S. PATENT DOCUMENTS

| | | | |
|---|---|---|---|
| 1,455,933 A | 5/1923 | Peterman | |
| 1,584,725 A | 5/1926 | Brandstetter | |
| 1,809,337 A | 6/1931 | Hall | |
| 3,384,916 A * | 5/1968 | Hockin | 15/313 |
| 3,449,787 A | 6/1969 | Rothstein et al. | 15/313 |
| 4,443,909 A | 4/1984 | Cameron | |
| 4,903,911 A * | 2/1990 | Sepka | 15/315 |
| 5,189,753 A | 3/1993 | Sousa et al. | 15/313 |
| 5,829,091 A | 11/1998 | Ingram et al. | 15/313 |
| 6,128,804 A | 10/2000 | Lee et al. | 15/313 |
| 6,148,472 A | 11/2000 | Arena | 15/313 |
| 6,416,009 B1 * | 7/2002 | Iaciofano et al. | 242/384.7 |
| 6,817,058 B1 | 11/2004 | Harrelson, II | |
| 2004/0107528 A1 * | 6/2004 | LeClear et al. | 15/313 |

FOREIGN PATENT DOCUMENTS

| | | |
|---|---|---|
| DE | 3833284 A1 | 4/1989 |
| DE | 29921025 U1 | 4/2000 |
| FR | 2689474 A1 | 4/1992 |

* cited by examiner

*Primary Examiner*—Theresa T. Snider
(74) *Attorney, Agent, or Firm*—Michael D. Lafrenz; Tara M. Hartman

(57) ABSTRACT

A vacuum cleaner assembly in a vehicle has a suction nozzle and controls for the vacuum all located within a reach zone of the driver sitting the driver's seat. The suction nozzle is mounted to the vehicle, either as part of the central vacuum system or on a portable vacuum cleaner.

20 Claims, 20 Drawing Sheets

SYSTEM OF VACUUM ACCESSIBILITY FOR A VEHICLE

BACKGROUND OF THE INVENTION

This invention claims the benefit of Provisional case No. 60/430,295, filed Dec. 2, 2002 and Non-Provisional case No. 10/648,575 filed Aug. 26, 2003.

1. Field of the Invention

The invention relates generally to vacuum cleaners installed in a vehicle. More particularly, the invention relates to an arrangement where a vacuum cleaner in a vehicle is accessible by the driver and under the control of the driver.

2. Description of the Related Art

Conventional techniques to vacuum the interior of vehicles require the use of exterior household vacuum cleaners and related attachments or, alternatively, the use of fixed vacuum systems typically installed outside of commercial car washes and typically requiring the repeated feeding of coins. The household vacuum cleaners require the cleaning operation to occur in garages, or close to the house where there is a convenient source of electrical power. Vacuuming motor vehicles at commercial carwashes typically utilize exterior stanchions, where a retractable hose is connected to a fixed vacuum unit.

The advent of handheld cordless vacuum cleaners enabled users to carry such portable vacuum cleaner units in a vehicle, untethered to electrical cords. It is known to use portable vacuum cleaners specifically adapted to connect to the vehicle power source, as disclosed in U.S. Pat. No. 5,189,753 to Sousa et al. It is also known to use built-in central vacuum cleaning systems in a vehicle as in U.S. Pat. No. 3,449,787 to Rothstein et al., U.S. Pat. No. 5,829,091 to Ingram et al., and U.S. Pat. No. 6,128,804 to Lee et al. Further, U.S. Pat. No. 6,148,472 to Arena suggests the use of a wet/dry vacuum system in a vehicle. Each of these references are hereby fully incorporated by reference into the present application for their teaching of the construction and operation of a vacuum system.

However, such units typically do not have the power and suction of a conventional vacuum cleaner. Furthermore, if rechargeable, they typically have short cycle times such that when power runs low, they must be recharged before vacuuming can continue. Moreover, there is no convenient storage for such devices; they often rattle around the vehicle and end up in the trunk or elsewhere outside the ready grasp of the driver. Thus they are rarely available for use at the time that a spill occurs.

The one exception to the above described ritual and habit is that there are limited times when the position of authority shifts or there is a sharing of authority between the driver and the front seat passenger. This can, for example, be delegated authority, as in the case where a parent driver expects the other parent non-driver to handle certain matters of control and authority, or inherent authority, as when a vehicle owner or a dominant partner in a relationship asks the other person to drive. For such times, conveniences are advantageously located so as to be within the reach of both the driver and the front seat passenger. Again, this has been recognized in the placement of some vehicle systems but has gone unrecognized in the case of vacuuming systems.

It is therefore believed that ready acceptance of a vehicle vacuum system by consumers will require convenient and reliable access by the seated driver to the system without exiting the vehicle and more particularly without having to move from the comfort of the driver seat to access or assemble components.

Through in-vehicle observation of consumers (called ethnography) the inventor has learned that there are specific habits and rituals that consumers observe in their vehicles, and these habits and rituals are rarely violated. Thus, devices and vehicle features introduced into the vehicle environment need to meet actual needs, as well as do so in an acceptable manner. If they do not meet these previously unrecognized needs, they will have limited commercial success.

For vacuums, this means that they need to be easily reachable by everyone, especially the driver and preferably by the front seat passenger as well. By attaching the vacuum to a location within arm's reach of the driver, the consumer is not required to leave their seat to locate the vacuum and initiate the cleaning process. Requiring one to leave their seat is outside of current consumer habits and rituals, and would be a critical impediment for vacuum adoption. There are many specific locations that qualify for being considered within arm's reach of the driver. Some of these are: overhead in the sound deadening head liner; in the sides or back of either of the two front bucket seats; under or part of the rear seats; in the console or dashboard; under the front seats; in the "A" or "B" pillars; and adjacent or recessed in the floor or doors.

In the present situation, the vacuum process for vehicles which is assumed by currently available vacuum systems as well as dictated by such currently available vacuum products is that the vehicle occupant or operator identifies a need to vacuum and either (a) the vehicle is taken to a location where a vacuum capable of cleaning vehicle interiors exists where the vehicle operator or occupant gets out of the vehicle to locate the vacuum hose, feeds coins into the machine if necessary, and then clean the vehicle or (b) the vehicle is parked and the driver gets out of the vehicle to locate and operate a portable vacuum.

Both of these state of the art vacuuming processes are inconvenient and therefore the vacuuming is often postponed, potentially resulting in the spill being ground in to the carpet or seat.

Another observation of consumer rituals and behaviors relates to their desire to eat in their vehicles. While many people want to eat or to feed their children in the vehicles, they are often hesitant to do so, or they restrict the type of food permitted in the vehicle because of the likely mess and the inconvenience of prior art vacuum systems.

Given that there is a latent need for cleaning facilitation in the vehicle, and that, to be widely accepted, this need must be satisfied in a manner which honors the rituals and habits of consumers, certain essential processes emerge for a car vacuum product. What is needed, is effective and convenient vacuum cleaner accessibility within a vehicle.

SUMMARY OF THE INVENTION

The present invention provides a novel method and apparatus for vacuuming within a motor vehicle that satisfies the above described consumer rituals and behaviors.

Consumers are currently unable to conveniently clean the interiors of their vehicles. The interiors themselves do not offer any kind of device or appliance to facilitate cleaning. Neither do they make it possible to immediately clean the interior as soon as a mess or spill is made. The vacuums that are available are under-powered and there is no convenient place to store them in the vehicle.

These limitations of the prior art are overcome by the present invention of an arrangement where a portable or a central vacuum cleaner in a vehicle is mounted for convenient reach by the driver of the vehicle. This could be anywhere in the vehicle within reach of the driver including the console, overhead roof liner, under behind and around the front seats, in the dashboard, under the floor, in the A or B pillars or in or adjacent the door.

In one embodiment of the present invention, a vacuum is mounted in a console between the front seats. In another embodiment, the vacuum is mounted to the driver seat. In still other embodiments, the vacuum is mounted the headliner, the back of the front passenger's seat, under the dashboard, or under the chassis of the vehicle. In all cases, the nozzle of the vacuum, in the case of a central vacuum system, or the handle of the vacuum, in the case of a portable, are within reach of the seated driver.

In the embodiments with central vacuum systems the nozzle is preferably mounted to a hose reeled into a storage space within the console, in the dashboard, under or inside of the seat, under the floor, or in another convenient location. Preferably, the hose is long enough to reach to the exterior of the vehicle.

The vacuum cleaner may have controls near the nozzle, including, for example, an on-off switch, a switch to permit or drive the reeling and/or unreeling of the hose, and a blower switch to control the amount or direction of the airflow through the hose. The controls can also be on the dashboard or the door for access by the driver.

Preferably the vacuum comes equipped with a plurality of attachments which are designed to clean the various crevices and surfaces unique to vehicles. The attachments are stored within reach of the driver and preferably also within reach of the front seat passenger.

In one embodiment, the vacuum control system is interlocked with the transmission so that the vacuum is inoperable when the vehicle is in gear.

Still another embodiment is illustrated and described in a patent application entitled "Vacuum System for a Vehicle" filed on Aug. 26, 2003 and having Ser. No. 10/648,575, which is hereby fully incorporated by reference into this application.

The present invention further provides a novel and improved method for cleaning a vehicle wherein:
(a) The need to vacuum is identified by a vehicle occupant or the operator,
(b) The vehicle operator stops the vehicle if the vehicle is in motion, and
(c) The vehicle operator reaches for the vacuum system while remaining seated.
(d) The vehicle operator operates the vacuum system while remaining seated.
(e) The vehicle operator returns the vacuuming system to its original stored condition while remaining seated.

In one embodiment of the method of the present invention, the operator or a nearby vehicle occupant extends the required length of hose from a built-in hose storage unit either manually, or, if the vehicle has an automated reel, by depressing the hose extend button. In another embodiment, the operator extends the appropriate length of hose, and then hands the occupant the vacuum handle. These embodiments optionally includes automated operation of a hose feeding and/or retracting system preferably by operating a button located near the nozzle.

In still another embodiment, the vacuum is portable and the operator or a nearby vehicle occupant detaches a portable vacuum from a mounting station while remaining seated.

The method of the present invention optionally includes the steps of retrieving an appropriate attachment from storage and installing the attachment to the nozzle of the vacuum prior to operating the vacuum and the steps of returning the attachment to storage, all while remaining seated.

The many objects and advantages of the present invention will be readily apparent to those skilled in the art upon reading the following detailed description of the preferred embodiments together with the attached drawings wherein like reference numerals refer to like components throughout.

DESCRIPTION OF THE DRAWINGS

Figure 1:
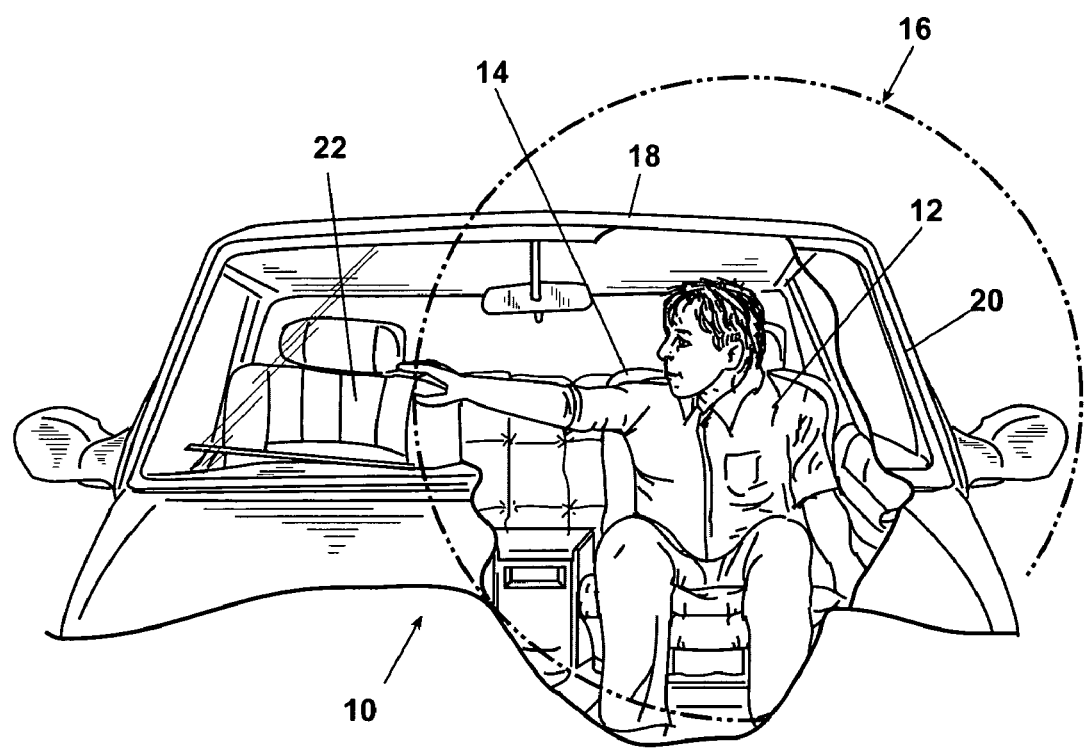
FIG. 1 is a front view, with portions broken away, of a vehicle showing the zone of convenient reach by a driver.

FIG. 1 illustrates a vehicle 10 with the driver 12 sitting in a driver's seat 14. As the driver 12 sits, there is in theory a reach zone 16 defined by the three-dimensional space where the driver can extend his or her arms for a comfortable reach. In reality, the reach zone 16 will normally be bounded by a ceiling 18 in the vehicle, the driver side door 20, and other impediments such as a passenger seat 22. According to the invention, access and control of the vacuum cleaner in the vehicle is provided entirely within the reach zone 16.

It will be appreciated by those skilled in the art that there is a similar reach zone for the front seat passenger. In some embodiments of the present invention, access and control of the vacuum cleaner is provided within the overlapping region of these two reach zones so that the vacuum may be easily accessed by either the driver or the front seat passenger. This may be desirable depending on the usage and behavior of the occupants of the vehicle. The size of the overlapping region will differ from vehicle to vehicle.

Figure 2:
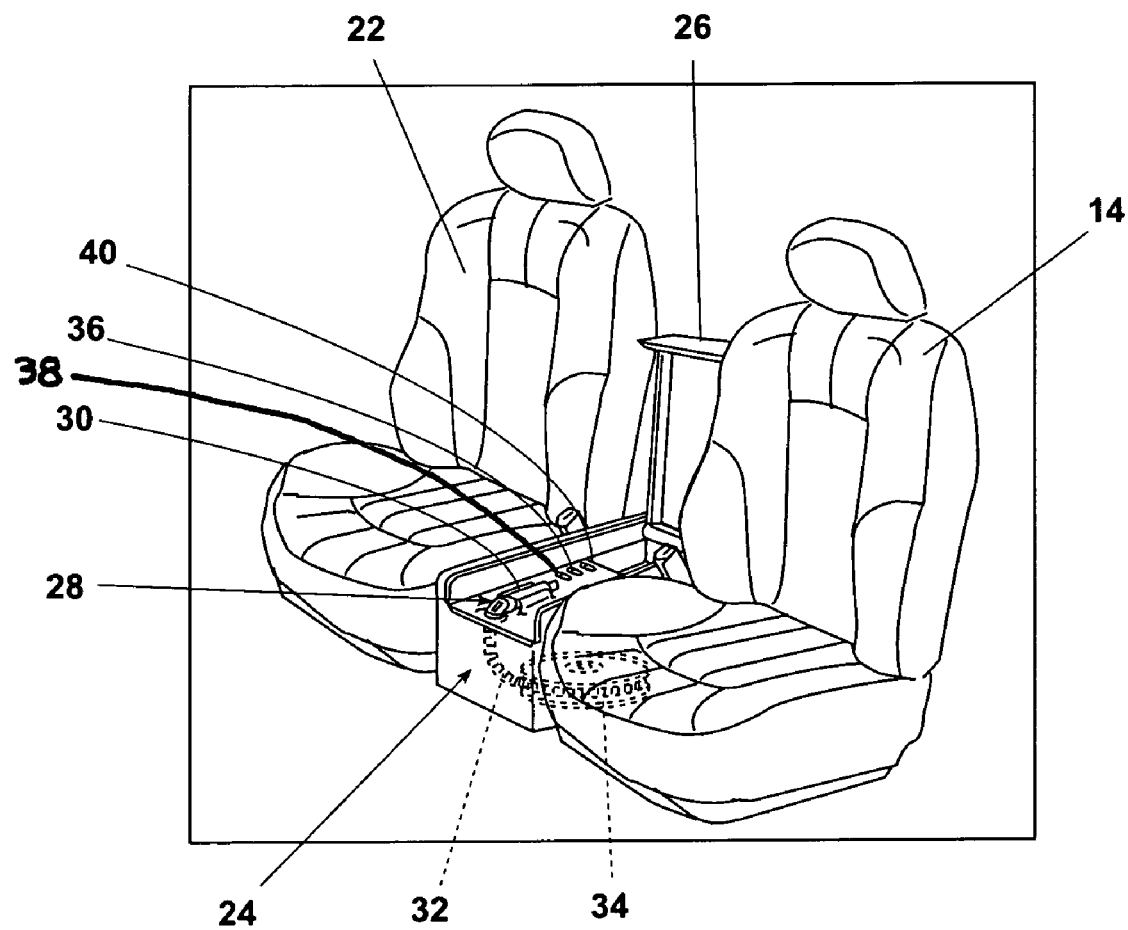
FIG. 2 is a front perspective view of the front seats of a motor vehicle showing a console-mounted central vacuum according to the invention.

Turning now to FIG. 2, a first embodiment of an arrangement according to the invention is shown. The driver's seat 14 and the passenger seat 22 are separated by a console 24. It will be understood that the console 24 is within the reach zone 16. The console 24 has a lid 26 that can be opened in conventional manner, and inside the console is a vacuum cleaner assembly 28. The vacuum cleaner assembly 28 comprises a suction nozzle 30, a vacuum hose 32, and a reel 34. It will be understood in all embodiments hereinafter described that the vacuum hose 32 on the reel 34 has a fluid connection to a vacuum source (not shown) somewhere in the vehicle and a repository (not shown) for collection of debris. The reel 34 can be a spring-loaded type where manually pulling the vacuum hose 32 will unwind it from the reel and a quick tug will unlatch a pawl and the spring bias in the reel will wind the vacuum hose back on the reel. Preferably, the reel 34 is motorized for winding and unwinding the vacuum hose 32.

There are several switches in the console 24. A reel switch 36 operates a motor to drive the reel 34 for unwinding and winding the vacuum hose 32. A vacuum switch 38 operates the vacuum source to generate a flow of air into the suction nozzle 30. A blower switch 40 causes the vacuum source to operate in a reverse direction, urging the flow of air out of the suction nozzle 30. It is within the scope of the invention for the switches 36, 38, and 40 to have alternate arrangements. For example, the vacuum switch 38 and the blower switch 40 can be poles of a double throw switch. Also, the switches can be placed on the suction nozzle 30 for single hand access. Another alternative includes providing sensors for detecting the tensile/compressive forces in the hose and automatically extending/retracting the hose accordingly.

Figure 3:
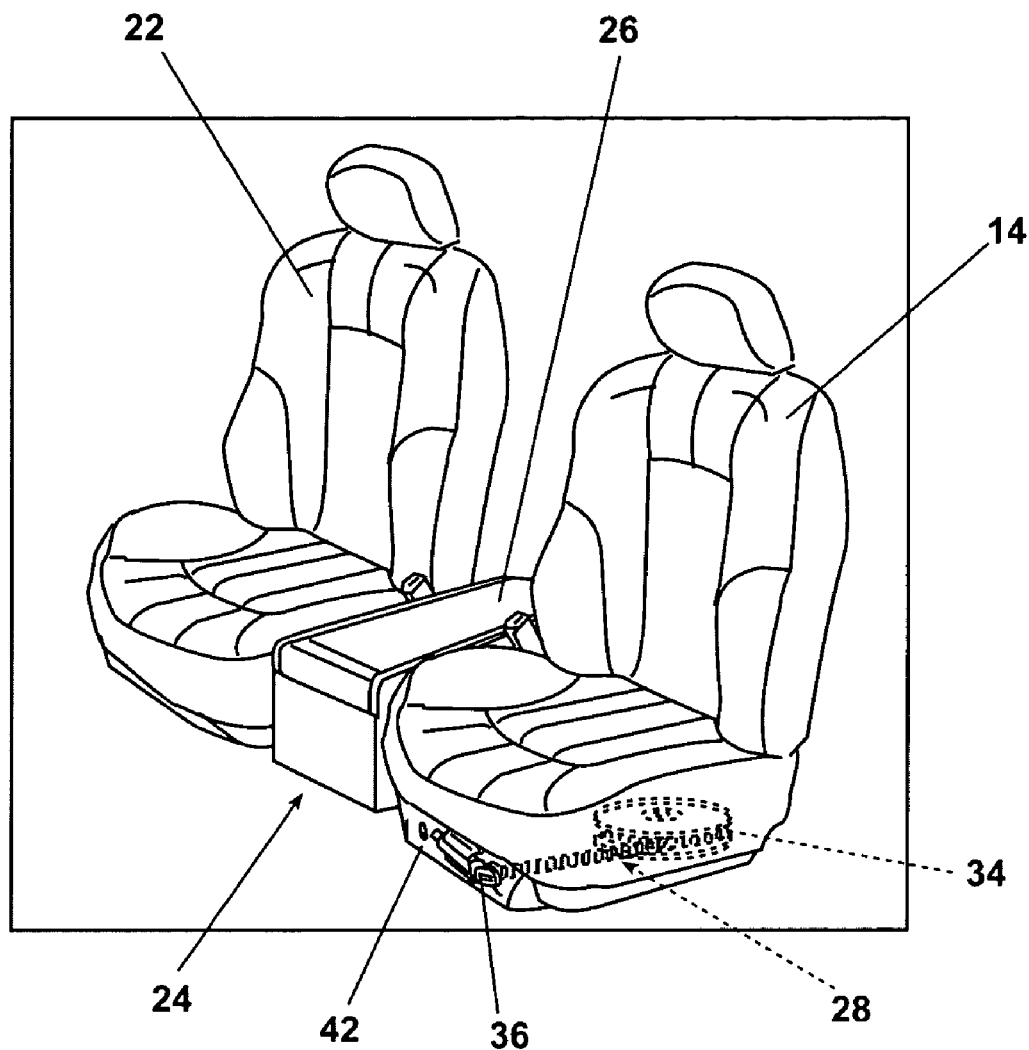
FIG. 3 is a front perspective view of the front seats of a motor vehicle showing a seat-mounted central vacuum according to the invention.
Figure 3A:
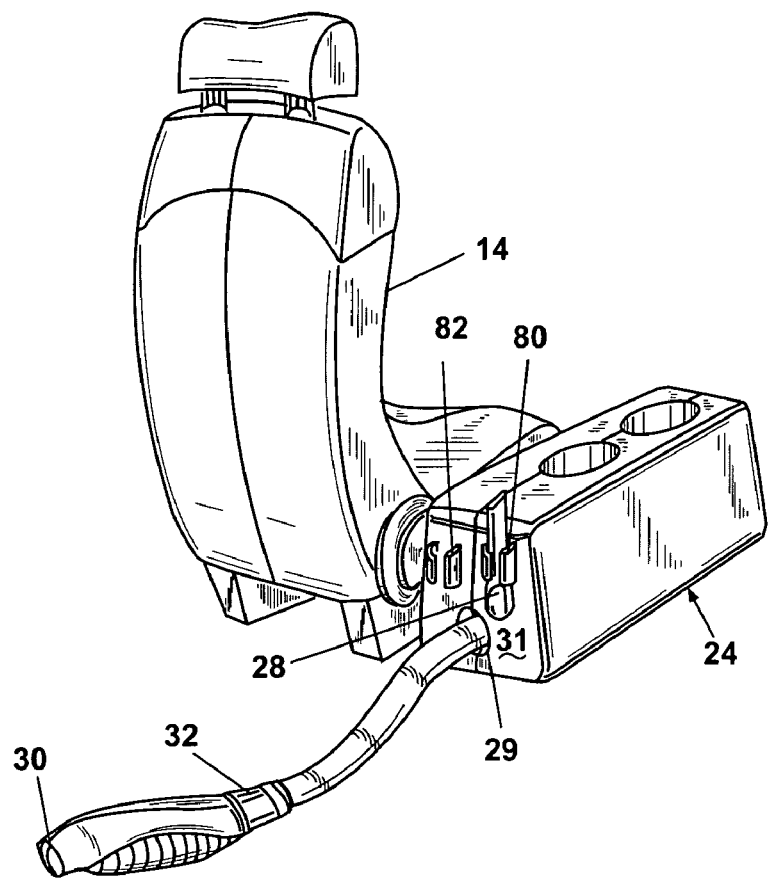
FIG. 3A is a rear perspective view of the front seats of a motor vehicle showing an alternative central mounted vacuum according to the present invention.
Figure 3B:
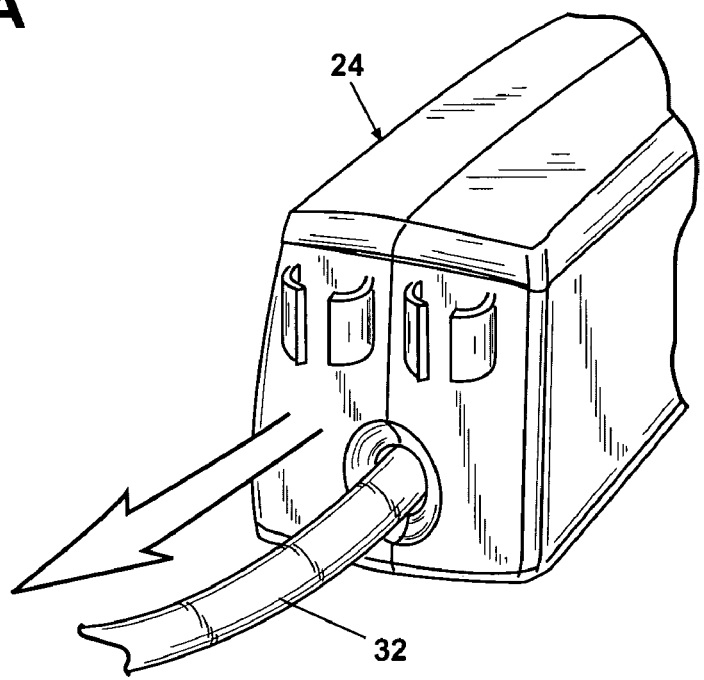
FIG. 3B is an enlarged partial perspective view of the alternative central mounted vacuum cleaner of FIG. 3A.

FIG. 3 illustrates an alternative embodiment of a vacuum arrangement according to the invention. Here as in subsequent embodiments, like components will bear like numerals for convenience and clarity, and features described with reference to one embodiment may be incorporated into other embodiments. In the embodiment of FIG. 3, the driver's seat 14 and the passenger seat 22 are separated by a console 24, and the console 24 has a lid 26 that can be opened in conventional manner. Here, however, the vacuum cleaner assembly 28 is disposed on and beneath the driver's seat 14. The reel 34 is mounted beneath the driver's seat 14 and the suction nozzle 30 is mounted to the front 42 of the driver's seat for accessibility by the driver within the reach zone 16. The mount is preferably a snap fit or a socket that will receive and retain the suction nozzle 30. Operating switches can be located on the front 42 of the seat, or on the suction nozzle 30. The switches can also be conveniently located elsewhere in the reach zone 16, such as on the dashboard, steering wheel, console, or on the driver's door.

Figure 4A:
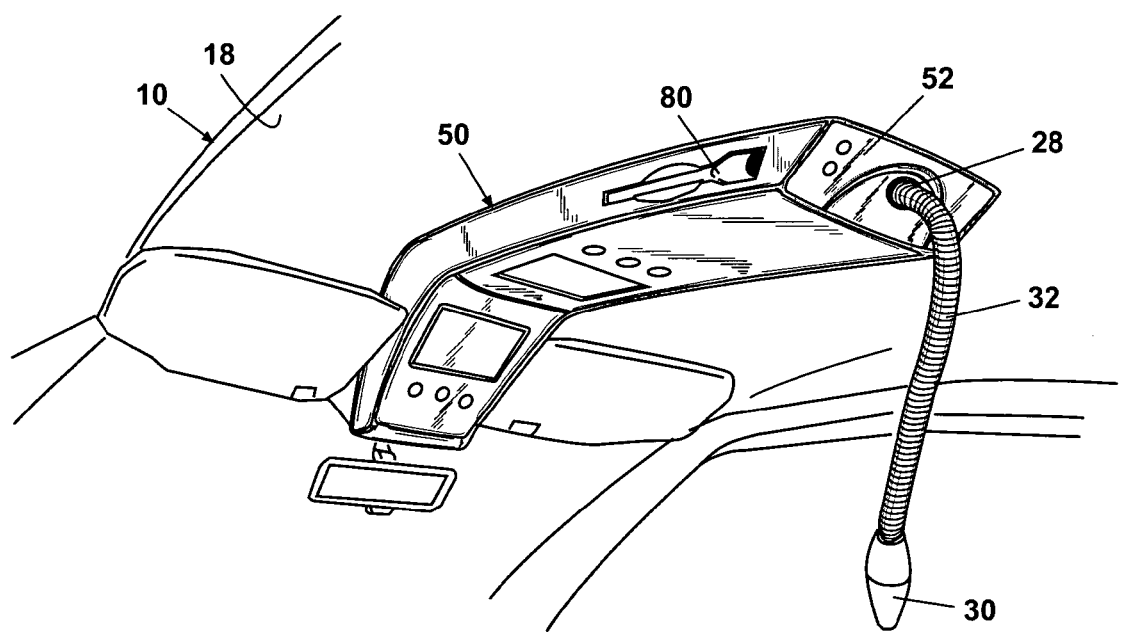
FIG. 4A is a perspective interior view of the headliner of a motor vehicle showing the over-head mounted central vacuum according to the present invention.

FIG. 4A illustrates another alternative embodiment of a vacuum arrangement according to the invention. In this embodiment, the vacuum cleaner assembly 28 is mounted in an overhead console 50 on the vehicle ceiling 18. The reel 34 is mounted within the console 50 and the suction nozzle 30 is mounted to a face 52 of the console 50 for accessibility by the driver within the reach zone 16. The mount is preferably a snap fit or a socket that will receive and retain the suction nozzle 30. Operating switches can be located on the face 52 of the console 50, or on the suction nozzle 30. The switches can also be conveniently located elsewhere in the reach zone 16, such as on the dashboard or on the driver's door. A crevice tool 80 and other attachments are removably mounted in recesses in the overhead console 50.

Figure 4B:
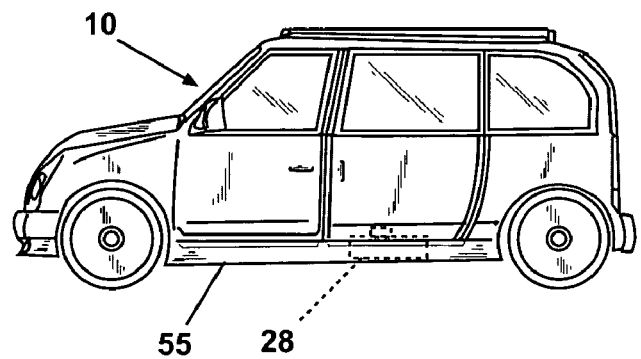
FIG. 4B is a side elevational view of a motor vehicle illustrating a location for mounting an under chassis central vacuum system according to the present invention.
Figure 4C:
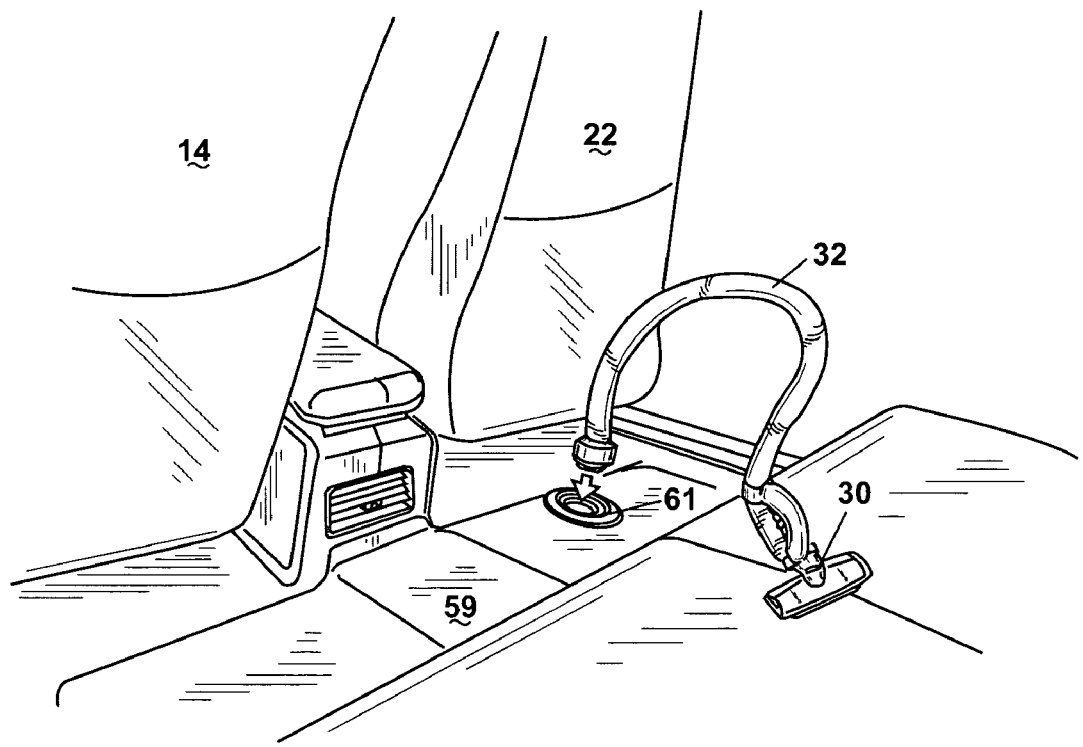
FIG. 4C is a perspective rear view of the front seats of a motor vehicle showing an under chassis central vacuuming system.

FIGS. 4B and 4C illustrate schematically a chassis mounted vacuum cleaner assembly 28 mounted to the underside of the chassis 55 of the motor vehicle 10. The vacuum hose 32 is removably connectable to port 61 in the floor 59 of the motor vehicle for operable interconnection with the vacuum cleaner assembly 28. The vacuum hose may be stored in the console 24 or in any location with the reach zone 16.

Figure 4D:
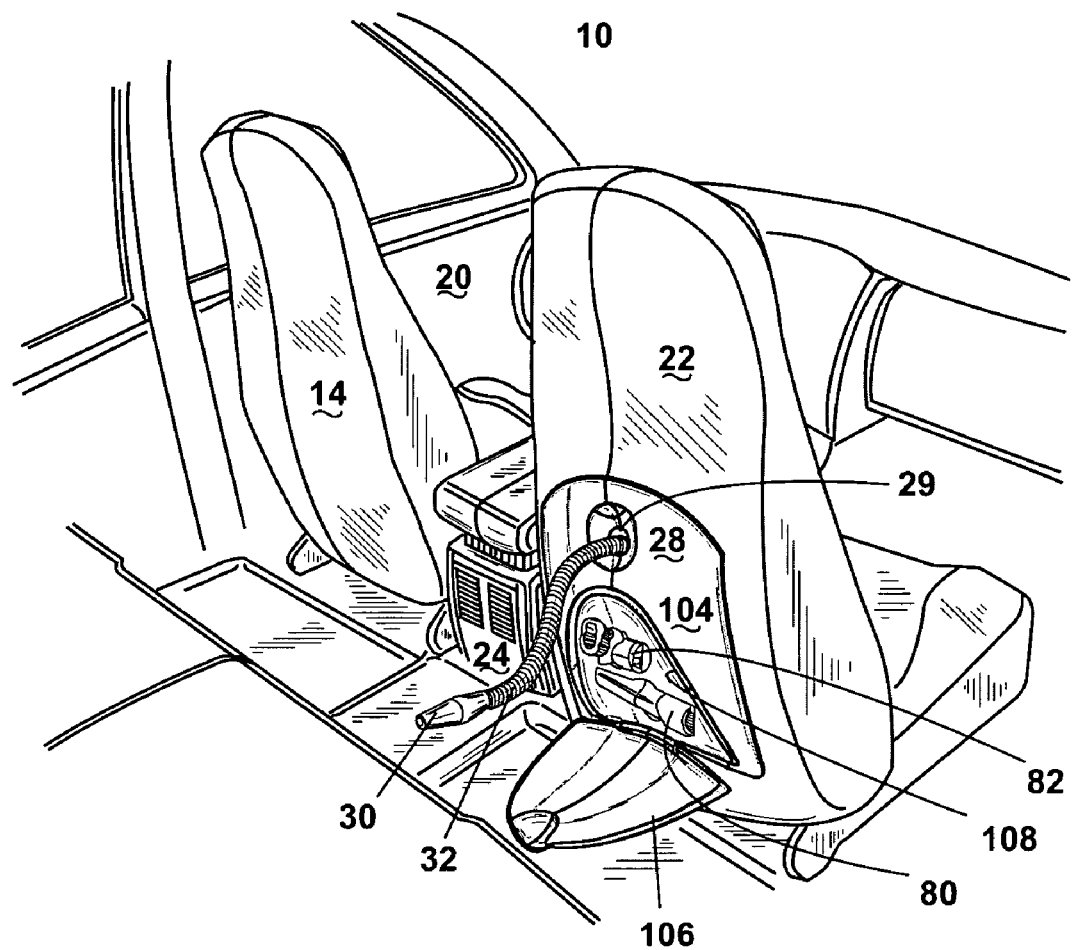
FIG. 4D is a rear perspective view of the front seats of the a motor vehicle showing a seat-back mounted central vacuuming system.

FIG. 4D shows yet another embodiment of a vacuum arrangement according to the present invention in which the vacuum cleaner assembly 28 is incorporated into the back of the passenger seat 22. In this embodiment, some components of the vacuum cleaner assembly 28 may be disposed under the seat or under the chassis. The vacuum cleaner assembly 28 includes a plate 104 having a main portion flush with the back of the passenger seat 22. The vacuum hose 32 extends through a recessed opening 29 in the plate 104. A door 106 is hingedly connected to the plate 104 to selectively close a recessed compartment 108 in the plate 104. In the closed position, the door 106 is generally flush with the main portion of the plate 104. Attachments such as a crevice tool 80 and brush tool 82 are removable mounted to the plate 104 within the recessed compartment 108.

Figure 5:
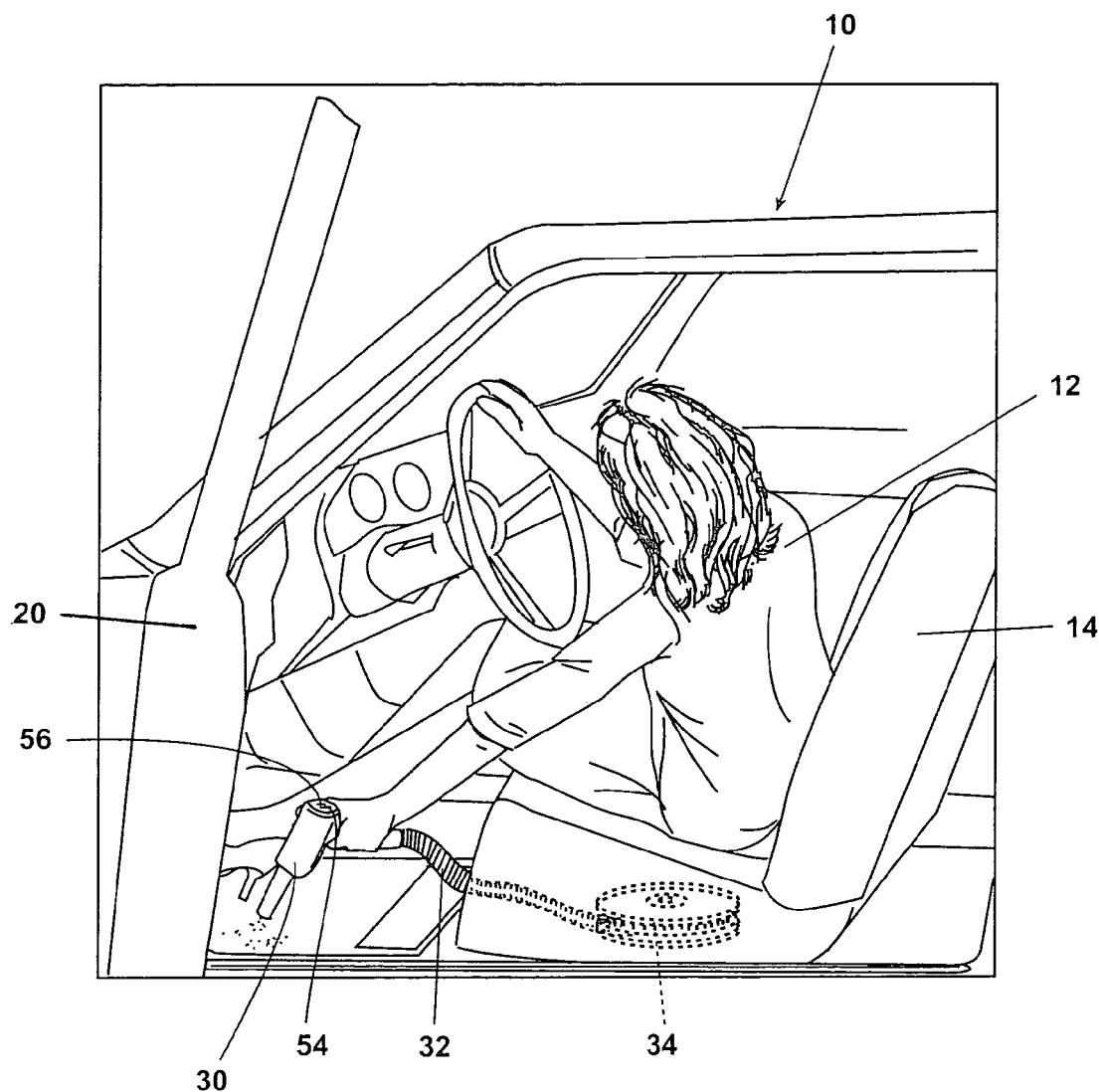
FIG. 5 is a side perspective view of the passenger compartment of a motor vehicle showing the embodiment of FIG. 3 in use according to process of the invention.

FIG. 5 illustrates how a driver 12 might use a vacuum assembly 28 according to the invention. Preferably, the driver will not also be driving the vehicle 10 while vacuuming for obvious safety reasons. In this illustration, the embodiment of FIG. 3 is contemplated. The driver 12 determines that a need exists for cleaning an area within the vehicle 10. The driver grasps the suction nozzle 30 and releases it from its mount on the seat 14. A reel switch 54 on the suction nozzle 30 is energized to unwind the vacuum hose 32 from the reel 34 beneath the seat. Actuation of a vacuum switch 56 starts the vacuum air flow in the suction nozzle 30. Upon completion of the cleaning event, the driver then turns the vacuum off by actuation of the vacuum switch 56 and returns the vacuum hose 32 to the reel by actuation of the reel switch 54. Mounting the suction nozzle 30 to the seat 14 completes the operation. Importantly, all is accomplished by the driver 12 without leaving the driver's seat 14 because the entire operation is within the reach zone 16.

Figure 6:
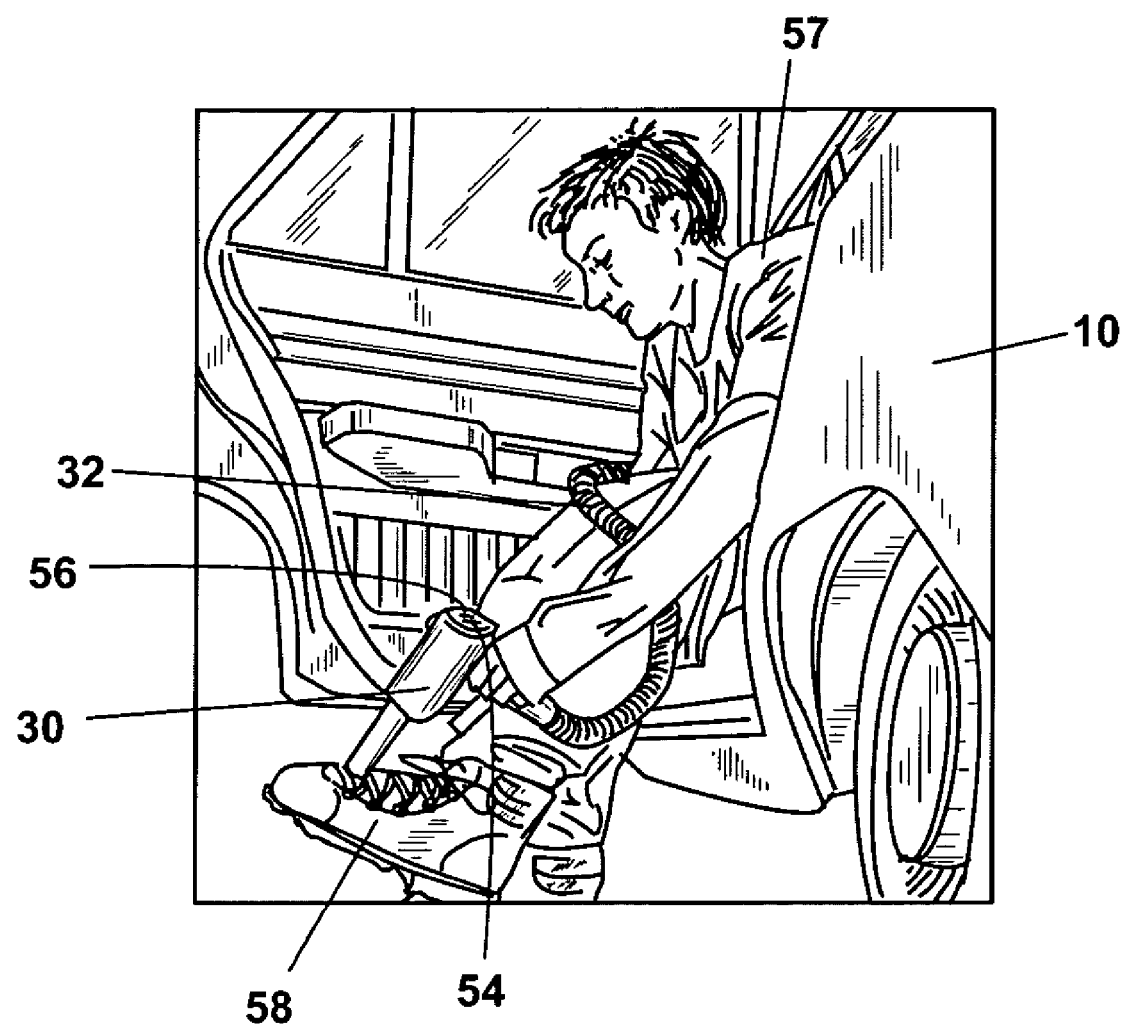
FIG. 6 is a perspective view similar to FIG. 5 but showing an alternative embodiment of the process.

Preferably, the vacuum hose 32 is long enough and extendable far enough to reach outside the vehicle 10, as illustrated in FIG. 6. This arrangement enables one to clean things outside the vehicle as well. Many kinds of mud and dirt that are introduced into the vehicle on shoes and feet can be conveniently cleaned up before they are tracked in. For example, an occupant 57 can sit in the vehicle 10 and clean dirty footwear 58 before placing his or her feet within the vehicle.

Even the floor of the garage can be cleaned, keeping garage floor mud or soils from being tracked into the house, especially in the winter. The portable vacuum can create an entire zone of cleanliness around and including the vehicle exterior, that had never previously been possible. Therefore, many vehicle soils can be prevented by vacuuming before the soils reach the car. The extended hose can create an entire zone of cleanliness around and including the vehicle exterior, that had never previously been possible.

Figure 7:
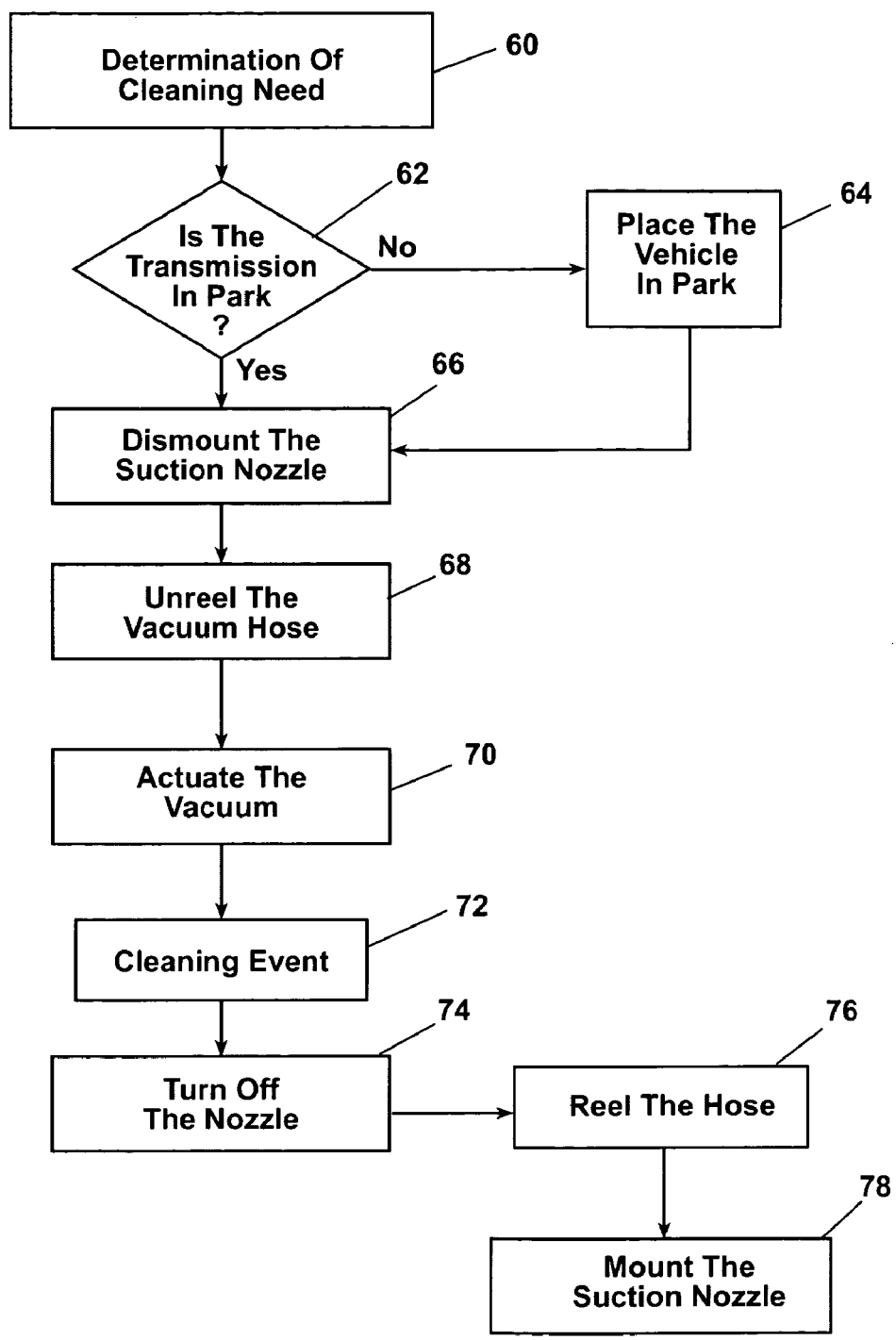
FIG. 7 is a flow chart showing a process according to the invention.

FIG. 7 illustrates schematically a process for operation of a vacuum cleaner arrangement in a vehicle according to the invention. The process of FIG. 7 assumes that there is some sort of interlock between the vacuum and the vehicle that will not permit operation of the vacuum until the vehicle is in park. The process commences with a determination 60 of the need for cleaning. A decision 62 evaluates whether the vehicle transmission is in park or not. With an interlock, the vacuum will not work unless the vehicle transmission is in park. If not in park, the operator must add a step 64 to place the vehicle in condition for the vacuum operation. When the vehicle transmission is in park, the operator dismounts the suction nozzle at 66 and then unreels the vacuum hose at 68. Actuation of the vacuum at 70 enables the operator to conduct the cleaning event 72. Upon completion of the cleaning event 72, the operator turns off the vacuum at 74, reels the hose at 76, and mounts the suction nozzle at 78 to complete the process.

Figure 8:
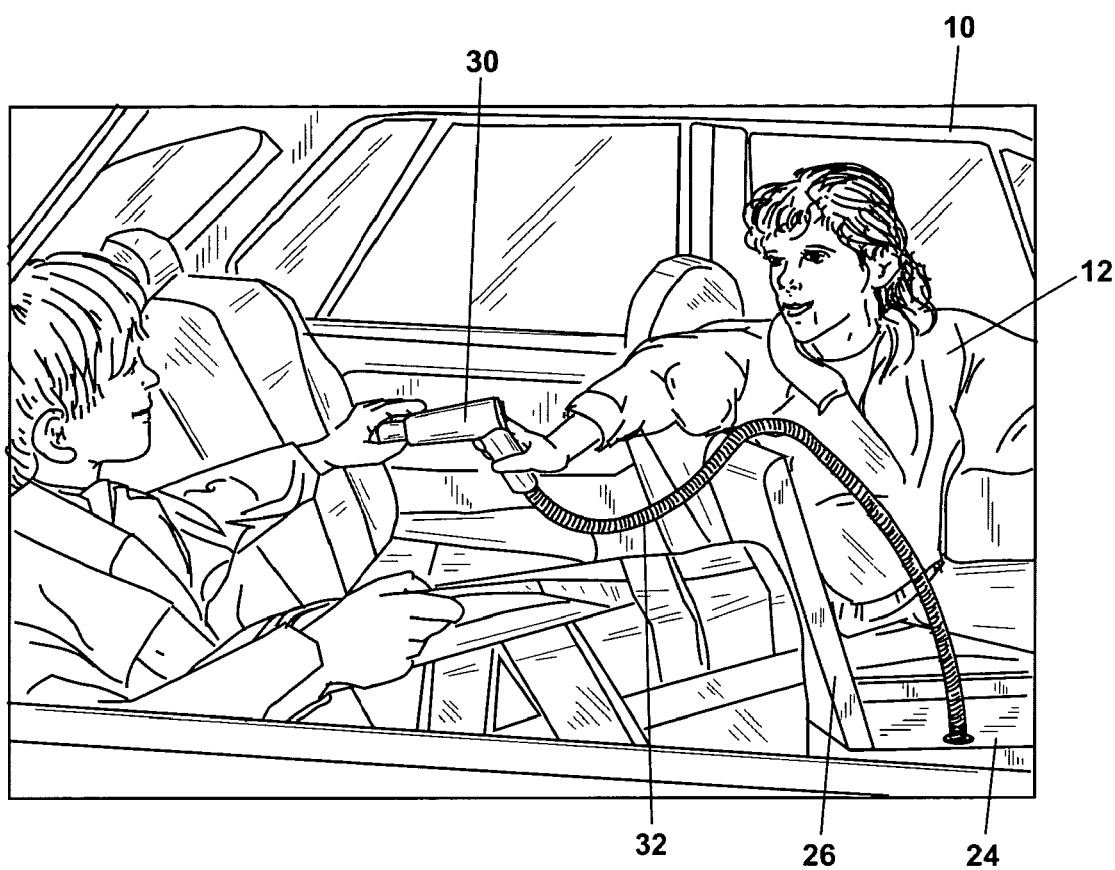
FIG. 8 is a side perspective view of the passenger compartment of a motor vehicle showing a further process according to the invention.

Even though access to the vacuum assembly 28 is provided within the reach zone 16, there may still be areas in the vehicle 10 outside the reach zone 16 that need cleaning. In FIG. 8, the driver 12 has retrieved the suction nozzle 30 from the console 24 and unreeled a portion of the vacuum hose 32, all within the reach zone 16. But with a sufficient length of hose, the driver can pass the suction nozzle 30 to another occupant 57 for either cleaning areas outside the reach zone 16, or cleaning any area in the vehicle outside the reach zone of the driver 12. The latter may be valuable to avoid distractions to the driver while driving, for example, assuming that there is no interlock preventing operation of the vacuum while the vehicle is in motion. An interlock can be a default condition that might be manually overridden by the driver under certain conditions.

Figure 9:
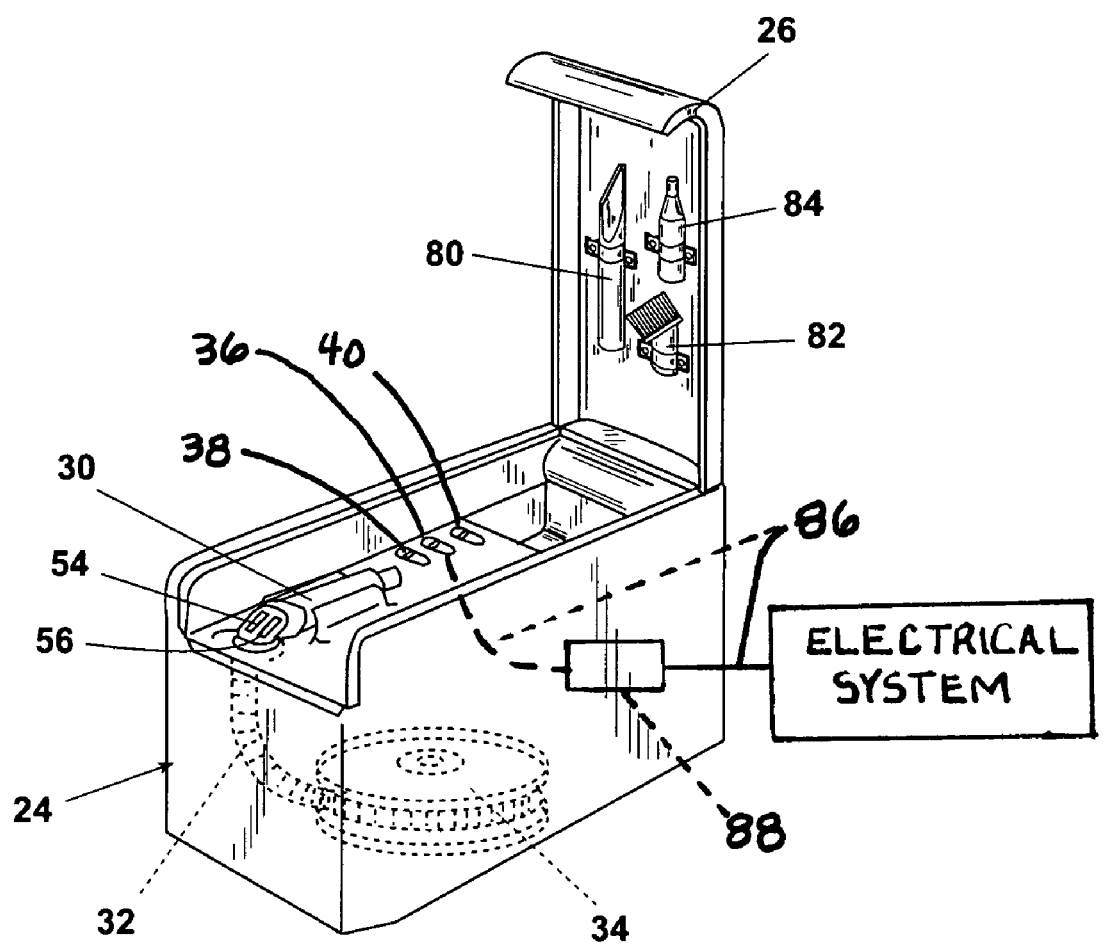
FIG. 9 is an enlarged perspective view of the console-mounted central vacuum of FIG. 2.

To facilitate the cleaning event, various accessories can be provided as shown in FIG. 9, all within the reach zone. Here, a crevice tool 80, a brush tool 82 and a blower spout 84 are mounted to the inside of the lid of the console 24. It is possible to have the tools 80, 82, and 84 mounted to the suction nozzle 30 for ready access by the driver regardless of the position of the suction nozzle. Of course other tools commonly used in cleaning are within the scope of the invention. The nature of the vacuum assembly within the invention also contemplates using a cleaning spray, a heated cleaning solution, and wet/dry vacuum pickup. The latter is important if the system is to be used to pick up spills in addition to dirt. FIG. 9 shows switches 36, 38 and 40, with a power supply cable 86 extending from the electrical system of the vehicle to reel switch 36. A normally closed disconnect switch 88 is installed in the cable 86 to disconnect the power supply to switch 88 whenever the vehicle is in drive mode.

Figure 10:
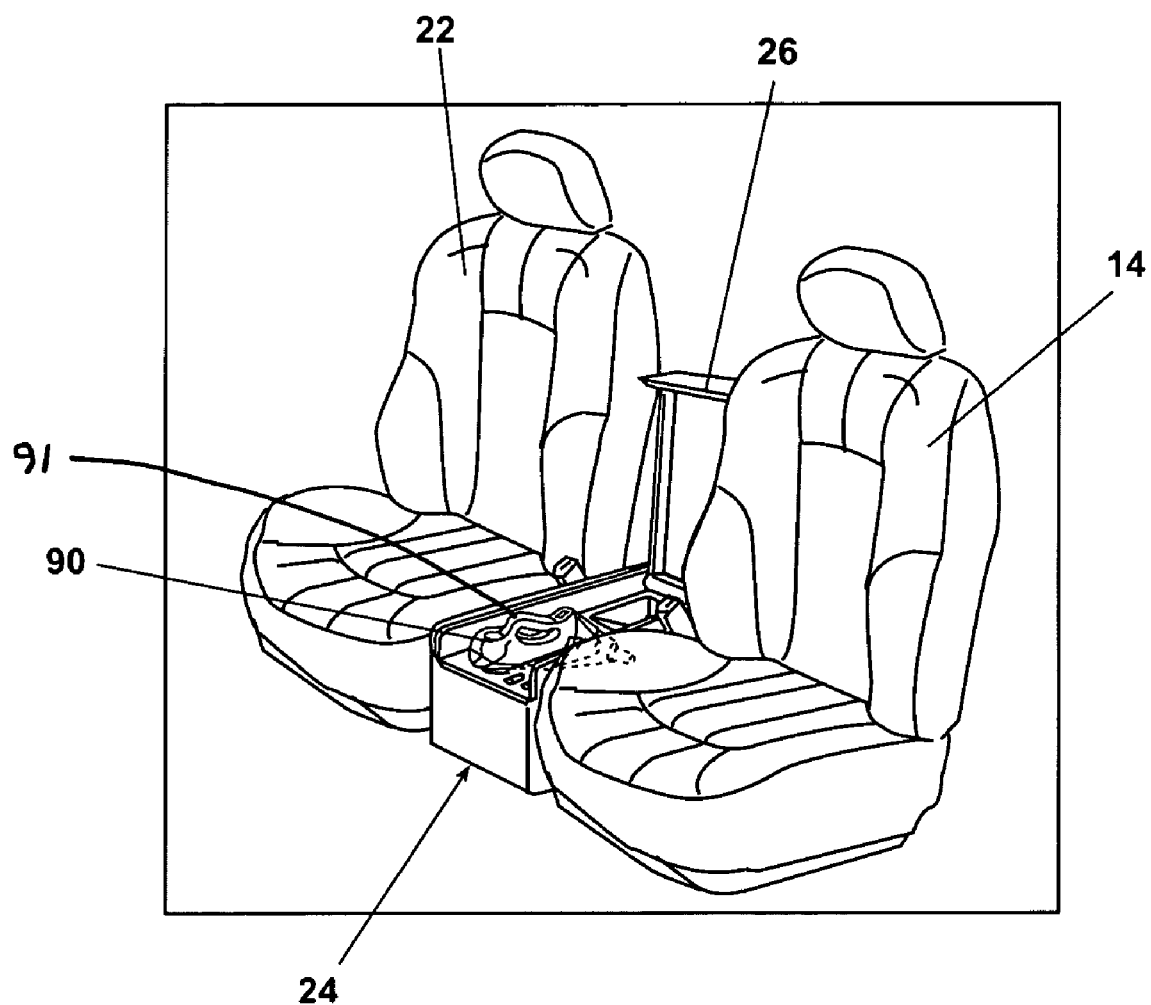
FIG. 10 is a front perspective view of the front seats of a motor vehicle showing a console-mounted portable vacuum according to the invention
Figure 11:
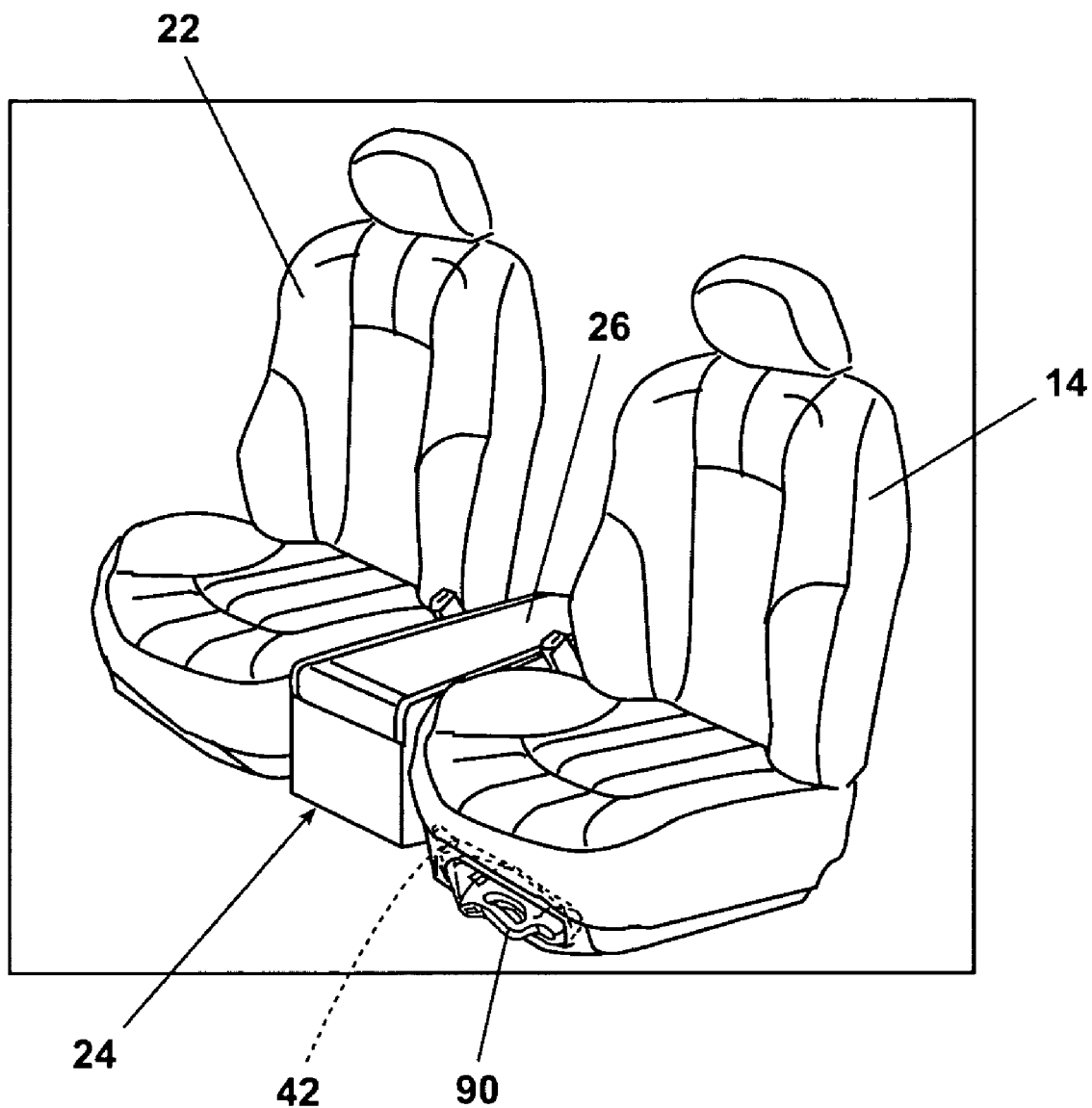
FIG. 11 is a front perspective view of the front seats of a motor vehicle showing a seat-mounted portable vacuum according to the invention.
Figure 12:
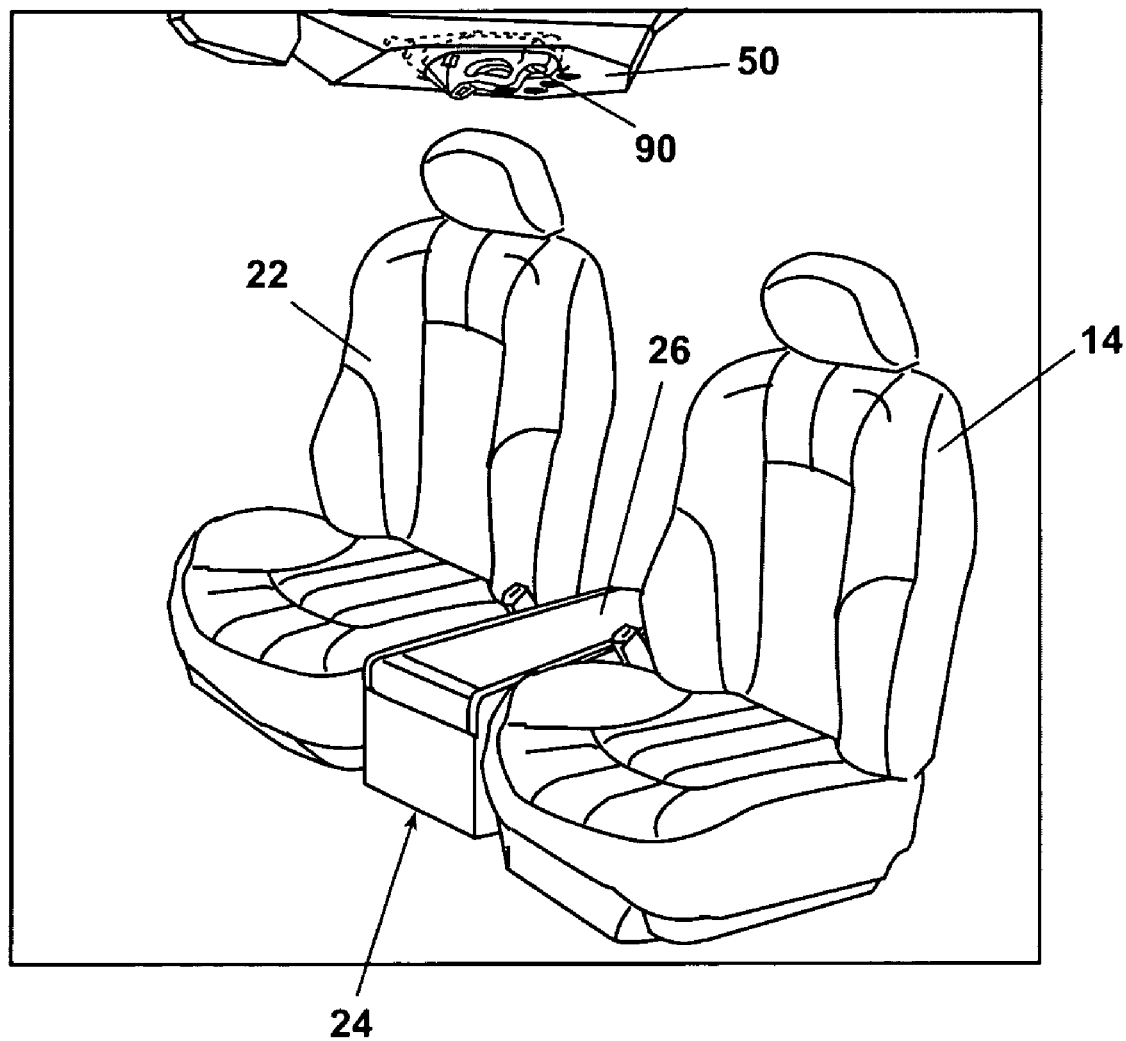
FIG. 12 is a front perspective view of the front seats of a motor vehicle showing an overhead-mounted portable vacuum according to the invention.

FIG. 10 shows another embodiment of an arrangement according to the invention. The driver's seat 14 and the passenger seat 22 are separated by a console 24. It will be understood that the console 24 is within the reach zone 16. The console 24 has a lid 26 that can be opened in conventional manner, and inside the console is a portable vacuum cleaner 90 with a handle 91. The portable vacuum cleaner is releasably mounted to the console 24 so it does not move when the vehicle is in motion. The mount can be any type of a retaining structure such as a snap fit, a socket or a holster. Preferably the portable vacuum cleaner 90 is cordless and the mount has a power socket connected to the vehicle electrical system that enables the cleaner to be recharged whenever it is mounted and the vehicle engine is operating. FIG. 11 shows the portable vacuum cleaner 90 mounted to the front 42 of the driver seat 14. FIG. 12 shows the portable vacuum cleaner 90 mounted to the overhead console 50.

Figure 13:
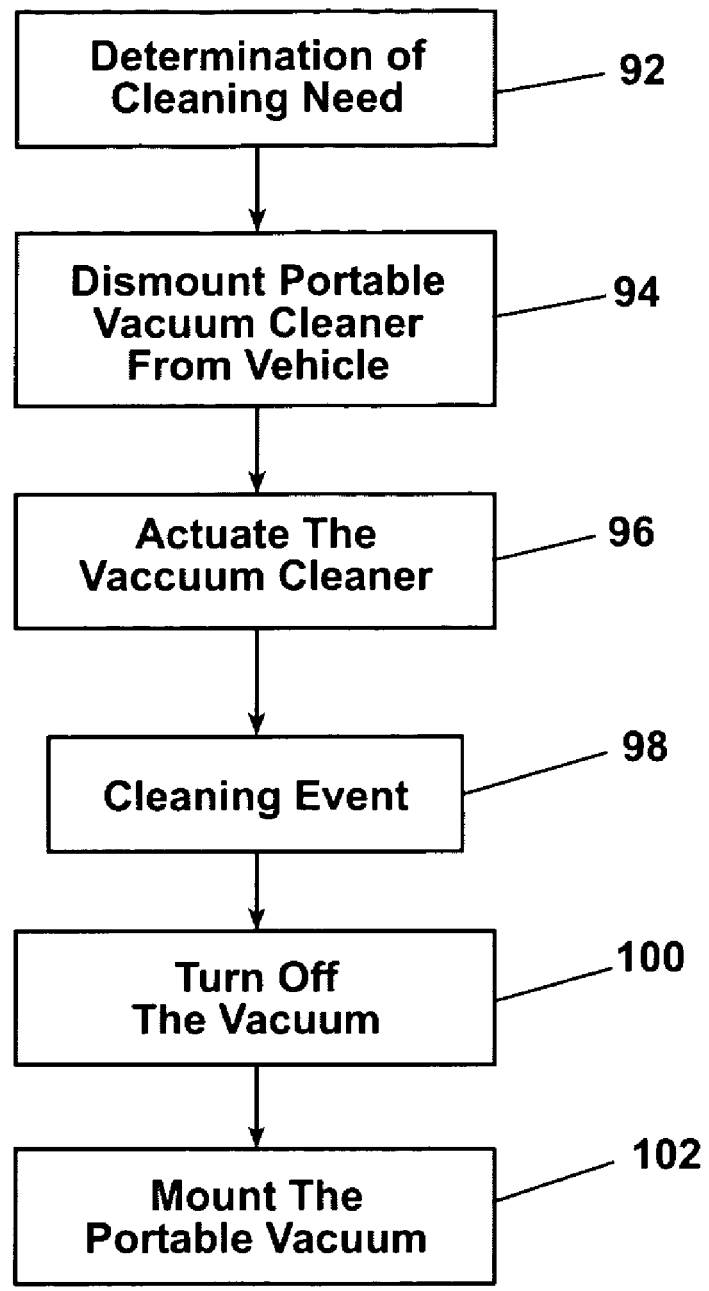
FIG. 13 is a flow chart showing an alternate process according to the invention.
Figure 14:
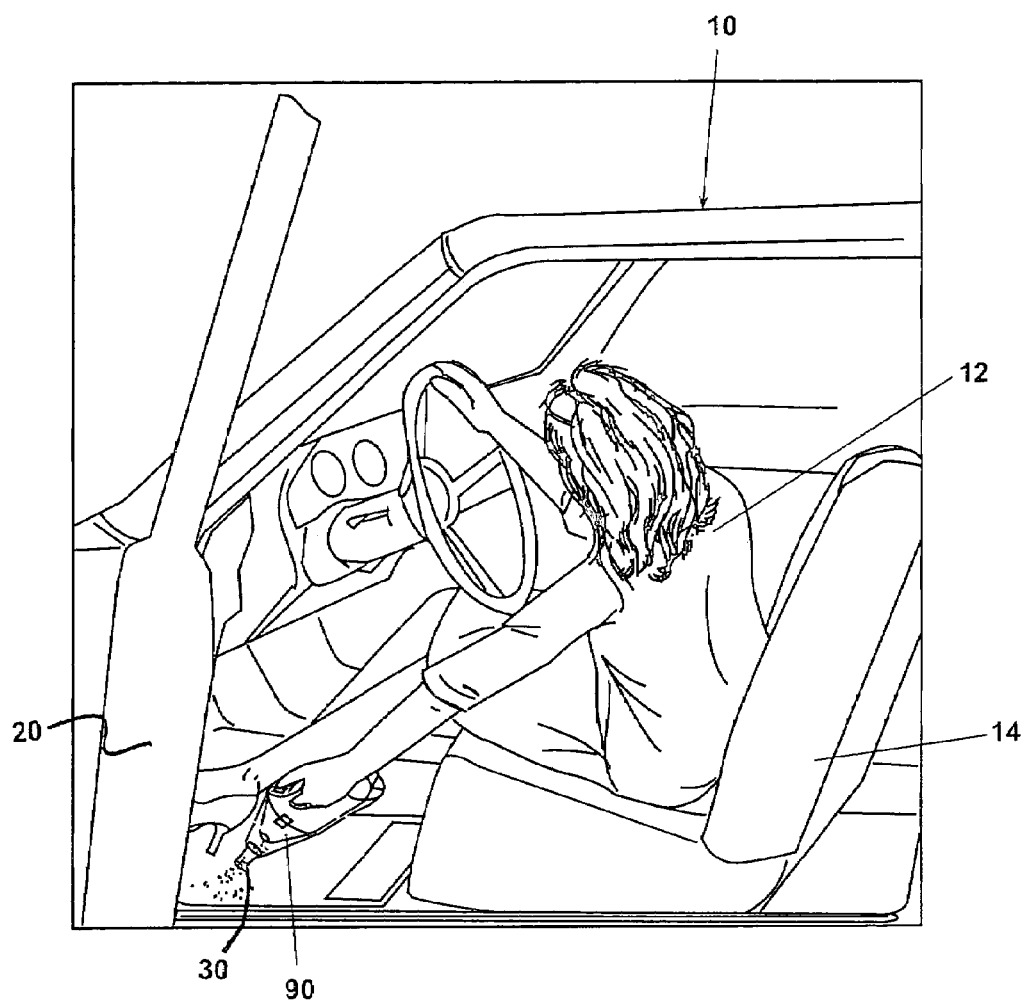
FIG. 14 is a side perspective view showing the embodiment of FIG. 11 in use according to the process of the invention.

In FIG. 13, a process of using the portable vacuum according to the invention is illustrated. The process commences with a determination 92 of the need for cleaning. The operator dismounts the portable vacuum cleaner at 94 and then actuates the vacuum at 96 to enable the operator to conduct the cleaning event 98. Upon completion of the cleaning event 98, the operator turns off the vacuum at 100, and mounts the portable vacuum cleaner to the vehicle at 102 to complete the process. In FIG. 14, the driver 12 is shown operating the portable vacuum cleaner 90.

Figure 15:
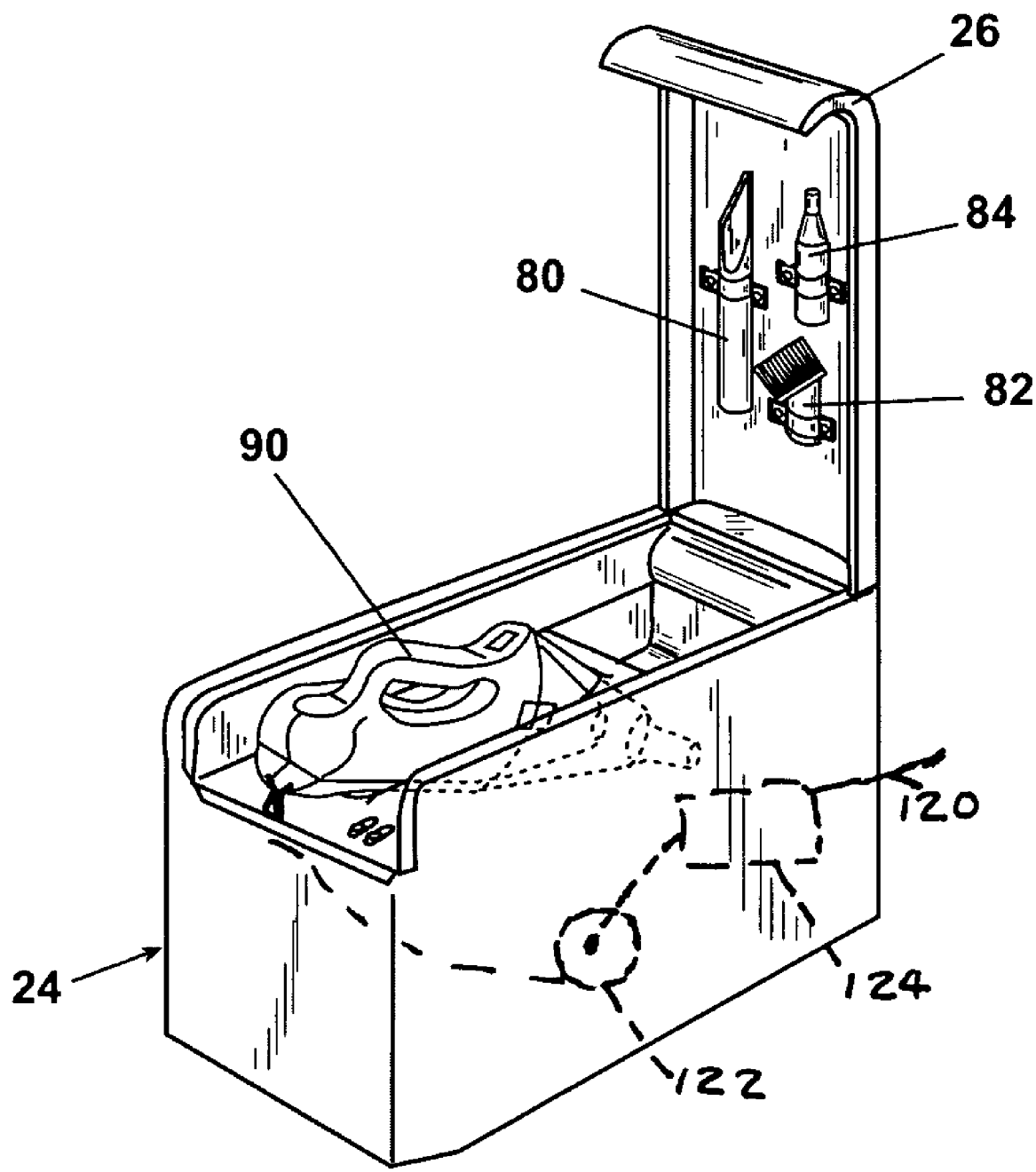
FIG. 15 is an enlarged perspective view of the console mounted portable vacuum of FIG. 10.
Figure 16:
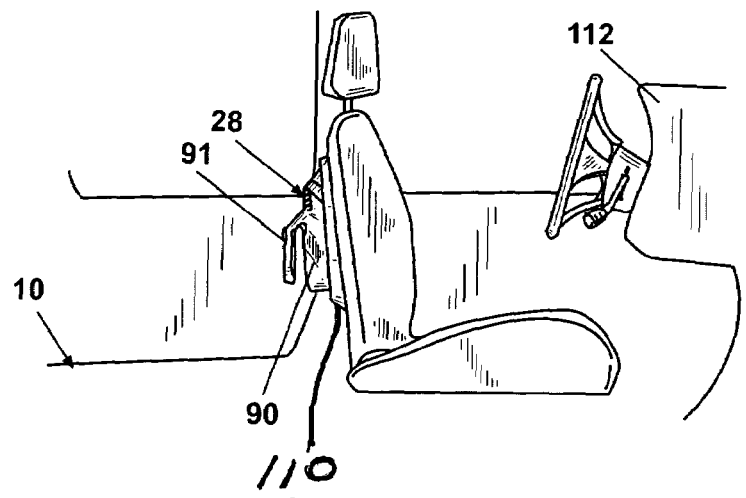
FIG. 16 is a side partial schematic view of the front half of a passenger compartment of a motor vehicle showing a seat-back mounted portable vacuum according to the invention.
Figure 17:
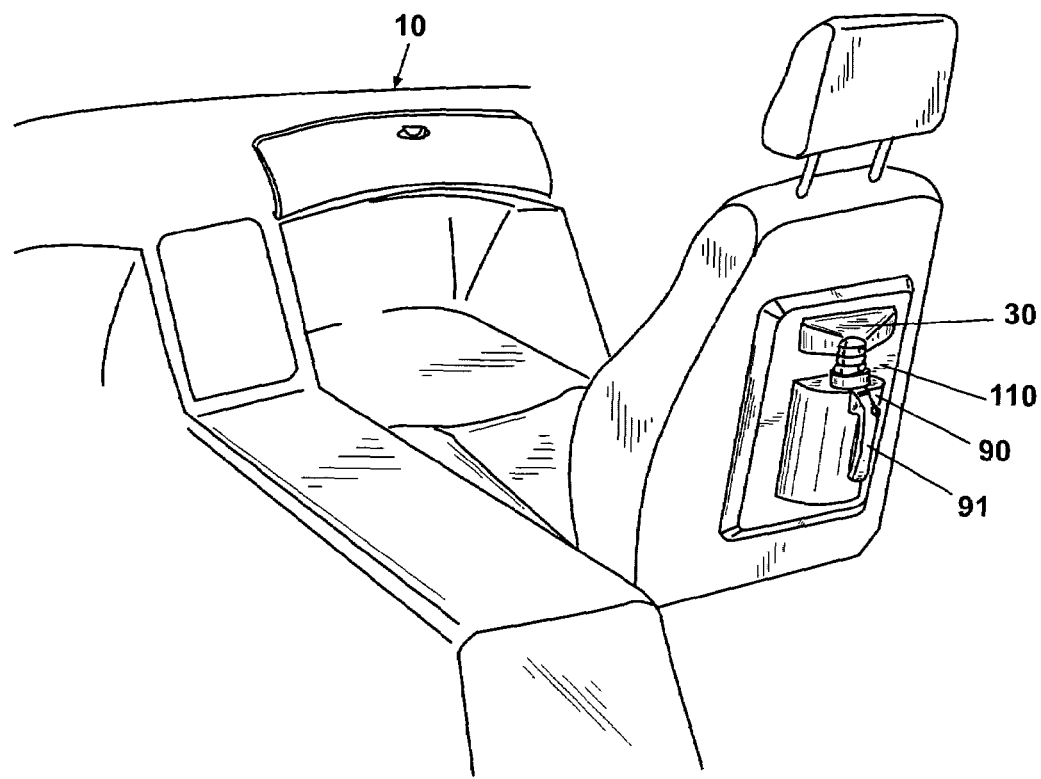
FIG. 17 is a rear perspective view of the front passenger seat of a motor vehicle showing the portable vacuum of FIG. 16.

FIG. 15 shows the types of attachment tools that might be available for use with the portable vacuum cleaner 90, including a crevice tool 80, a brush tool 82, and a blower spout 84. Of course, for the latter, it is understood that the vacuum source for the portable vacuum cleaner 90 is reversible. FIG. 15 shows the portable vacuum unit 90 being powered by an electrical power supply cable 120 that is coiled around a spring retracting reel 122 that in turn is connected to the electrical system of the vehicle. The power supply cable 120 also includes a disconnect switch 124 that is only closed when the vehicle is in a non-drive mode.

Figure 18:
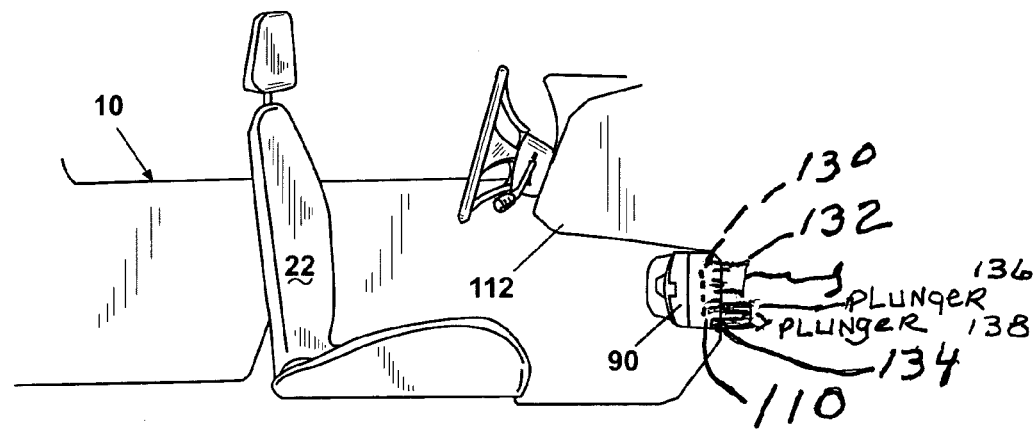
FIG. 18 is a side partial schematic view of the front half of a passenger compartment of a motor vehicle showing a dashboard mounted portable vacuum according to the invention.
Figure 19:
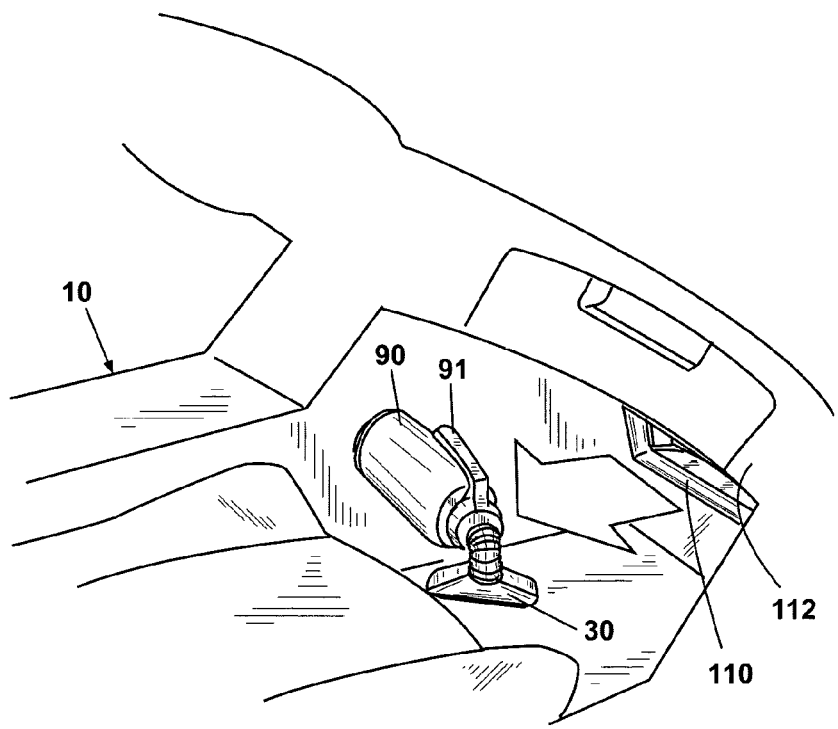
FIG. 19 is a rear perspective view of the front passenger seat of a motor vehicle showing the portable vacuum of FIG. 18.

FIGS. 16, 17, 18 and 19 illustrate two other embodiments of a portable vacuum cleaner 90 according to the present invention removably mounted either in a cradle 110 on the back of the passenger seat 22 (in FIGS. 16 and 17) or under the dashboard 112 of the motor vehicle 10 (FIGS. 18 and 19). It is contemplated that the cradle 110 may incorporate a recharging functionality. FIG. 16 through 19 shows a battery powered portable vacuum unit 90 that is dockable in a cradle 110. The vacuum unit 90 has a 2-prong female receptacle 130 that engages electrical contacts 132 when the unit is docked in the cradle 110. The electrical contacts 132 are connected to the electrical system of the vehicle to charge the battery of the portable unit when it is docked. The portable unit 90 also contains an internal toggle switch 134. The cradle has two plungers that actuate toggle switch 134 when the unit is docked. One plunger 136 moves the toggle switch to open position and normally engages the toggle switch to prevent use of the unit when the vehicle is in drive mode. The other plunger 138 projects into the portable unit to close the toggle switch only when the vehicle is in a non-drive mode. Thus the portable vacuum unit is only operable in the non-drive mode of the vehicle.

It is also within the scope of the invention for the portable vacuum cleaner to include a spray for application of a cleaning solution, and/or to be a wet/dry vacuum. It is also possible for the cleaner to be a steam generator for steam cleaning.

A principle advantage of the method and apparatus of the present invention as described above in numerous embodiments is that the initiation of the cleaning process does not need to wait until a vacuum can be brought to the vehicle or until the portable vacuum can be located, perhaps in the trunk.

Many vehicle soils are made worse by not being promptly addressed. Liquids dry and stain, mud dries and hardens, loose soils and small particles distribute throughout the vehicle interior. Soils located on the floor of the vehicle get ground into the carpet until they can be removed. By creating the ability to continually clean messes as soon as they occur, the overall state of cleanliness in the vehicle can be vastly improved.

A study of consumers and their rituals in vehicles informs us that product use processes which require the user to add extra steps such as getting out of their seat, are unlikely to be adopted and quickly fall into disuse. This explains why the current portable vacuum products have not achieved wide acceptance. Without a convenient storage and charging location, the current portables are largely left unused. Because the current portables are free to rattle around in the vehicle interior, they tend to be stored in trunks and other out of reach locations, making the likelihood of use even more remote. To meet this consumer need, the vacuum of the present invention is designed to always be within arm's reach of at least the vehicle operator, and perhaps one or more occupants.

While the invention has been specifically described in connection with certain specific embodiments thereof, including the best mode contemplated by the inventor at the time of filing, it is to be understood that these embodiments are provided by way of illustration and not of limitation, and the scope of the claims should be construed as broadly as the prior art will permit.

What is claimed is:

1. A method of designing and constructing an optimum vacuum cleaning system for an automotive vehicle, comprising:
   locating the internal surfaces of the vehicle, which are within the reach zone of the driver of the vehicle;
   providing a length of suction hose sufficiently long to reach around said reach zone and adjacent portions of the vehicle, selecting one of said surfaces to provide a space adjacent thereto sufficiently large to accommodate said suction hose, said suction hose stored in said space;
   providing a vacuum supply system to said hose;
   providing controls to activate and deactivate said vacuum supply system;
   locating said controls in a surface accessible to the driver within said zone, and providing means for disabling said vacuum system while the vehicle is in motion, and whereby cleaning can be done before dirt and stain interacts with the environment.

2. The method of claim 1 wherein said controls are located between the driver seat and the passenger seat of said automotive vehicle.

3. The method of claim 1 wherein said controls are located under the driver seat of said automotive vehicle.

4. The method of claim 1 wherein said controls are located adjacent the headliner of said automotive vehicle.

5. The method of claim 1 wherein said controls are located in the seat back of the front passenger seat of said automotive vehicle.

6. The method of claim 1 wherein said controls are located under the rear passenger seat of the automotive vehicle.

7. A method of designing and constructing a vacuum cleaning system for an automotive vehicle comprising:
   locating the internal surfaces of the vehicle which are within the reach zone of the driver of the vehicle;
   providing a portable vacuum cleaning unit to be powered by the electrical system of the vehicle;
   selecting one of said internal surfaces of the vehicle that are within the reach zone of the driver and which has a space behind the surface which is sufficiently large to accommodate said portable vacuum cleaning unit, said portable vacuum cleaning unit placed in the space and;
   providing automatic disabling means for disabling said portable unit when the vehicle is in a drive mode.

8. The method of claim 7 wherein said internal surface is between the driver seat and the front passenger seat of said automotive vehicle.

9. The method of claim 7 wherein said internal surface is under the driver seat of said automotive vehicle.

10. The method of claim 7 wherein said internal surface is adjacent to the headliner of said automotive vehicle.

11. The method of claim 7 wherein said internal surface is in the seat back of the front passenger seat of said automotive vehicle.

12. The method of claim 7 wherein said internal surface is under the rear passenger seat of said automotive vehicle.

13. A portable vacuum cleaning apparatus for an automotive vehicle comprising:
   a portable vacuum cleaning unit having an internal electric motor for providing a vacuum source;
   a portable vacuum cleaning unit storage means in said vehicle for storing said portable unit;
   a power supply for said portable vacuum cleaning unit, and;
   means for automatically disabling said portable vacuum cleaning unit when the vehicle is in a drive mode.

14. The portable cleaning apparatus of claim 13 wherein said power supply is provided by a power cord connected to the electrical system of the vehicle, and said disabling means disconnects said power cord from said portable unit.

15. The portable cleaning apparatus of claim 13 wherein the unit has a battery for the power supply to said internal electric motor, and said disabling means disconnects said battery from said internal electric motor.

16. The portable cleaning apparatus of claim 13 wherein said portable vacuum cleaning unit is located within a reach zone of the driver seat and comprises a length of suction hose sufficiently long to reach around the reach zone of the driver and adjacent portions of the automotive vehicle.

17. The portable cleaning apparatus of claim 13 wherein said portable vacuum cleaning unit further comprises controls to activate and deactivate said vacuum cleaning unit, said controls being located within the reach zone of the driver of the automotive vehicle.

18. A vacuum cleaning system for an automotive vehicle comprising:
  a length of flexible vacuum hose operatively connected to a vacuum source;
  a storage space in said vehicle for storing said flexible vacuum hose said storage space within a reach zone of one of a driver and an occupant of the vehicle; and
  means preventing said hose from being withdrawn from said storage space when the vehicle is in drive mode.

19. The vacuum cleaning system of claim 18 wherein said length of vacuum hose is sufficiently long to reach around the reach zone of the driver of the automotive vehicle.

20. The vacuum cleaning system of claim 18 further comprising controls to activate and deactivate said vacuum source, said controls being located within the reach zone of the driver of the automotive vehicle.

* * * * *